US005564192A

United States Patent [19]

Wilhelm et al.

[11] Patent Number: 5,564,192

[45] Date of Patent: Oct. 15, 1996

[54] GUIDE BAR FOR A SAW CHAIN OF A MOTOR-DRIVEN CHAIN SAW

[75] Inventors: Adolf Wilhelm, Backnang-Steinbach; Siegfried Frank, Remshalden-Buoch, both of Germany

[73] Assignee: Andreas Stihl, Waiblingen, Germany

[21] Appl. No.: 490,583

[22] Filed: Jun. 15, 1995

[30] Foreign Application Priority Data

Jun. 15, 1994 [DE] Germany .......................... 44 20 555.4

[51] Int. Cl.[6] .................................................... B23D 57/02

[52] U.S. Cl. ................................................ 30/387; 30/383

[58] Field of Search ............................... 30/387, 381, 383

[56] References Cited

U.S. PATENT DOCUMENTS

| | | | |
|---|---|---|---|
| 3,473,581 | 10/1969 | Merz | 30/387 |
| 4,903,410 | 2/1990 | Wieninger et al. | 30/387 |
| 4,965,934 | 10/1990 | Eriksson et al. | 30/387 |
| 5,249,363 | 10/1993 | Mitrega et al. | 30/387 |

*Primary Examiner*—Hwei-Siu Payer
*Attorney, Agent, or Firm*—Walter Ottesen

[57] ABSTRACT

The invention relates to a guide bar for the saw chain of a motor-driven chain saw. The guide bar has a guide groove which extends about the periphery thereof wherein the saw chain runs. The guide groove is delimited by two side plates which are tightly connected to each other and are held at a spacing relative to each other. The side plates are also approximately coincident with each other. At least one of the side plates has a connecting part which projects in a direction toward the other side plate. This connecting part lies with a contact surface on a corresponding counter surface of the other side plate. The connecting part of a side plate extends through the guide groove up to the other side plate and there contacts with its contact surface the counter surface of the other side plate. The contact surface and the counter surface lie approximately perpendicular against each other. In this way, a simple manufacture of the guide bar and an easy assembly thereof is guaranteed.

21 Claims, 12 Drawing Sheets

GUIDE BAR FOR A SAW CHAIN OF A MOTOR-DRIVEN CHAIN SAW

BACKGROUND OF THE INVENTION

U.S. Pat. No. 5,249,363 discloses a guide bar having a lamellar configuration. Individual lugs are bent over from the inner edge of a frame-shaped side plate. The lugs of two side plates are placed one atop the other so that they are coincident to each other and thereafter are welded in order to obtain a light torsion-resistant guide bar. A guide bar manufactured in this manner satisfies requirements in practice but the lugs have to be cropped with precise tolerances because the contact surfaces must lie precisely parallel to the side plates. Also, the perpendicular spacing must be exact because the doubled spacing determines the groove width. The manufacture of guide bars of this kind is therefore very time consuming and expensive and requires considerable know-how for assembly and welding.

SUMMARY OF THE INVENTION

It is an object of the invention to provide a guide bar of the kind described above which is improved so that a light torsion-resistant guide bar is provided with little complexity with respect to both manufacture and assembly.

The guide bar of the invention is for guiding a saw chain of a chain saw. The guide bar includes two mutually adjacent side plates which are approximately coincident to each other; the side plates being spaced from each other at a predetermined spacing (d) to conjointly define an outer peripheral guide groove for guiding the saw chain on the guide bar; a first one of the side plates having a connecting part projecting through the guide groove up to the second one of the side plates; the connecting part having a contact surface formed thereon to extend approximately perpendicular to the side plates; the second side plate having a counter surface likewise extending perpendicular to the side plates; the contact surface and the counter surface being in mutual contact engagement; and, holding means fixedly holding the first and second plates together to define said spacing (d).

The connecting part of the one side plate which extends through the guide groove lies against a perpendicular counter surface of the other side plate whereby the side plates are form-tightly engaged in the plane of the guide bar so that a connection is provided to take up torsion forces by simply placing the side plates one atop the other. A prejoined guide bar of this kind (even a light frame-type configuration of the side plates) already exhibits a high torsion stiffness without follow-up connecting measures having to be carried out. Simple connecting means for holding the side plates together can be selected because of the form-tight connection provided in the plane of the guide bar. These simple connecting means must take up exclusively forces occurring perpendicularly to the guide bar. The desired width of the guide groove can be defined within tight tolerances.

The contact surfaces and their counter surfaces preferably lie approximately parallel to the longitudinal center axis of the guide bar. At least one pair of contact surface/counter surface is provided especially on each side of the longitudinal center axis. Preferably, several pairs are formed.

It is advantageous to form the connecting parts as one piece with the side plate. The connecting parts are especially formed by belt-like lugs stamped out of the side plate. The weakening of the side plate caused by the stamped lugs is minimized when the lugs are connected at both longitudinal ends to the side plate. The longitudinal sides of the lugs are adequately precise because of the punching and stamping operation so that they are suitable as contact surfaces without further machining. It is preferable to configure the lugs with a center section lying parallel to and spaced from the side plate in order to keep the force-transmitting surfaces as large as possible.

The counter surface is especially configured to have an opening and is preferably defined by a breakthrough in the opposite-lying side plate. This can be done by a simultaneously punching and stamping to form the connecting parts. The longitudinal sides of the receptacles then define the counter surfaces which can serve, without further machining, for supporting the contact surfaces of a connecting part. Preferably, the connecting part with its contact surfaces lies approximately without play between the counter surfaces of a breakthrough.

According to a further embodiment of the invention, the side plates of a guide bar are configured to be the same. Production and storage are simplified in this manner since only like parts must always be manufactured and held in inventory. One of the side plates is rotated 180° about its longitudinal axis for assembling a guide bar.

According to a further embodiment of the invention, the connecting part can be configured as a latch and the receptacle as a lock. The latch is held in a form-tight manner in the lock perpendicular to the guide bar. According to an embodiment of this kind, only a safeguard, which applies hardly any load, must be provided to prevent a displacement in the longitudinal direction whereby a relative movement between lock and latch is prevented.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
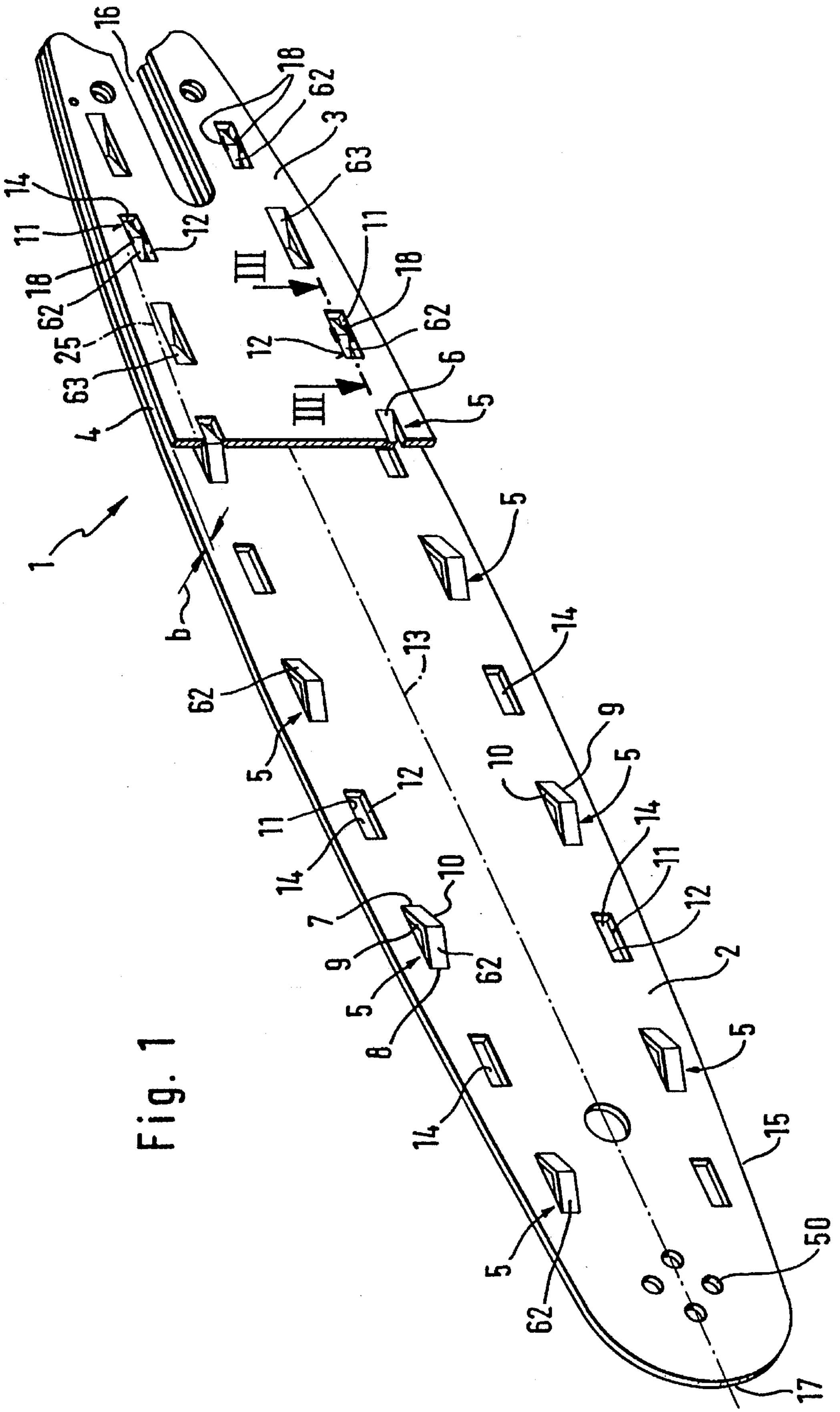
FIG. 1 is a perspective view of a guide bar assembled from two side plates with a portion of one side plate cut away.

The guide bar 1 shown in the drawings is assembled from two side plates 2 and 3. The side plates are full plates in the embodiments shown in FIGS. 1 to 4 and otherwise are configured as frame-like plates. Guide bars assembled in this lamellar manner have low weight but must be especially configured with respect to torsion stiffness. The two side plates 2 and 3 lie in coincidence one atop the other and delimit a guide groove 4 around the periphery thereof. The width (b) of the guide groove is determined by the spacing of the two side plates 2 and 3.

Each side plate (2 or 3) has several connecting parts 5 which are configured as one piece with the particular side plate in the embodiments shown. Preferably, the connecting parts 5 are configured by belt-like lugs (62, 63) which are punched and stamped. The lugs (62, 63) are connected at both longitudinal ends (7, 8) to the side plate. The longitudinal edges (9, 10) of the belt-like lugs (62, 63) define respective contact surfaces (9, 10) of the corresponding counter surfaces (11, 12) provided on the other side plate 3. The contact surfaces 9 and 10 and the counter surfaces 11 and 12 lie approximately perpendicular to the side plates 2 and 3. The contact surfaces 9 and 10 and the counter surfaces 11 and 12 lie preferably approximately parallel to the longitudinal center axis 13 of the guide bar. Occurring torsion forces cannot lead to a bending or spreading of the guide bar when the contact surfaces and counter surfaces lie precisely perpendicular to the side plates.

In the embodiments shown, the counter surfaces 11 and 12 are formed in a receptacle of the other side plate 3. This receptacle is preferably provided as an opening 14 such as a breakthrough which is rectangular when viewed in plan.

Figure 2:
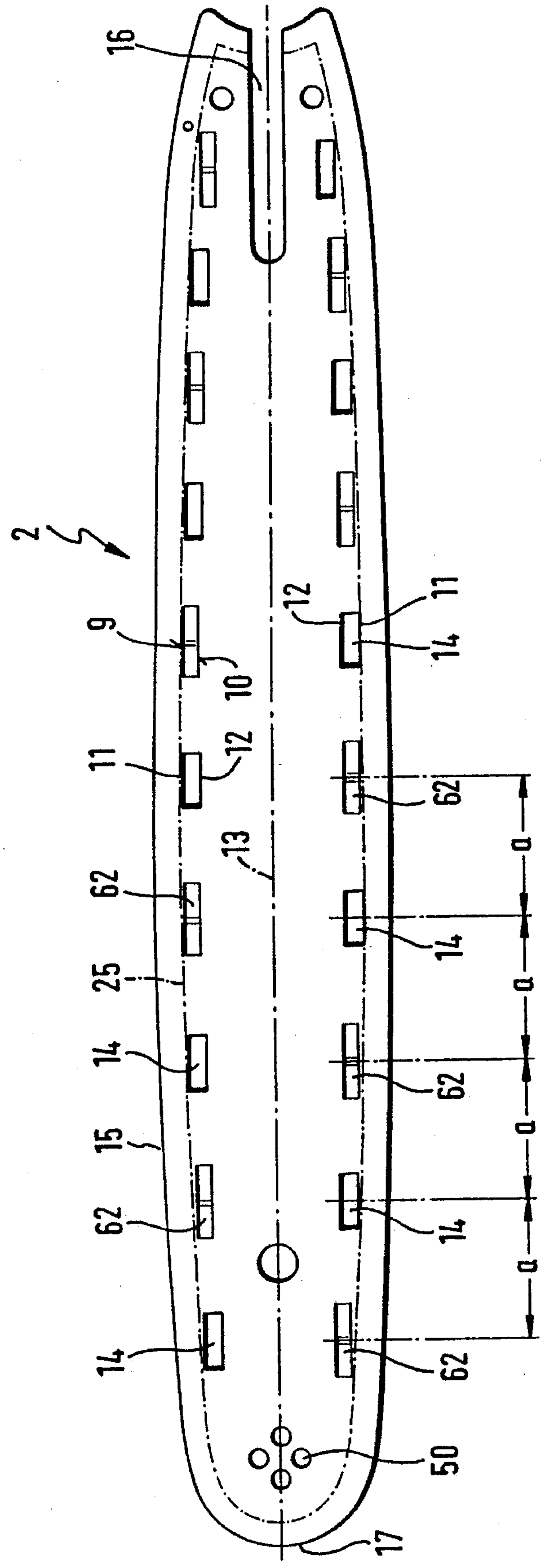
FIG. 2 is a plan view of a side plate of a guide bar of FIG. 1.

In the embodiment of FIGS. 1 to 4, lugs 62 and 63 and breakthroughs 14 are arranged on each side of the longitudinal center axis 13 in a row alternately one behind the other. The lugs and breakthroughs 14 are preferably slightly displaced in elevation with respect to each other. As shown in FIG. 2, the lugs 62 and the breakthroughs 14 lie along the periphery of the guide bar 1 with approximately equal spacing to the edge 15 of the guide bar and preferably approximately just below the elevation of the base 25 of the guide groove 4. The rearward end of the guide bar includes a longitudinal slot 16 open to the end of the guide bar. Starting from this rearward end, the spacings between lugs 63 and breakthroughs 14 become greater in the direction toward the tip 17. Preferably, the spacings (a) starting at approximately the center of the side plate (2 or 3) are equal up to the forward tip 17 (FIG. 2).

The side plates (2, 3) necessary for the assembly of a guide bar 1 are preferably configured to be the same. For assembly, one side plate is rotated 180° about its longitudinal axis and is placed on the other side plate so as to be coincident therewith. The lugs 62 and 63 of respective side plates 2 and 3 project out of the plane of each side plate and engage in the assigned receptacles or breakthroughs 14 of the opposite-lying side plate 2 or 3. Each lug 62 or 63 defines a connecting part and projects through the guide groove 4 below the base 25 of the guide groove and lies with the contact surfaces 9 and 10 on respective counter surfaces 11 and 12 of the other side plate. In this way, one lug 62 or 63 is held approximately without play transversely to the longitudinal center axis 13 in the plane of the guide bar so that the lugs (62, 63) fix the side plates (2, 3) form-tight in the plane of the guide bar 1 transversely to the longitudinal center axis 13 thereof. The engagement of a lug 62 in an opening 14 is shown enlarged and in section in FIG. 3. From FIG. 3, it can be seen that the spacing (d) of the side plates 2 and 3 to each other corresponds to the width (b) of the guide groove 4 (FIG. 1). During assembly, the spacing (d) of the side plates 2 and 3 to each other can be ensured by a template or the like.

After the side plates are placed together, the lugs (62, 63), which project into the openings 14, are preferably welded into these openings as shown in FIG. 1 by the schematic illustration of the weld seams 18. For this purpose, a laser welding process is suitable because the side plates are then only heated in narrow limited zones. Accordingly, the problem of a distortion of the side plates is minimal. It can also be advantageous to provide a casting or injection mold material in the hollow spaces between the side plates (2, 3).

Figure 3:
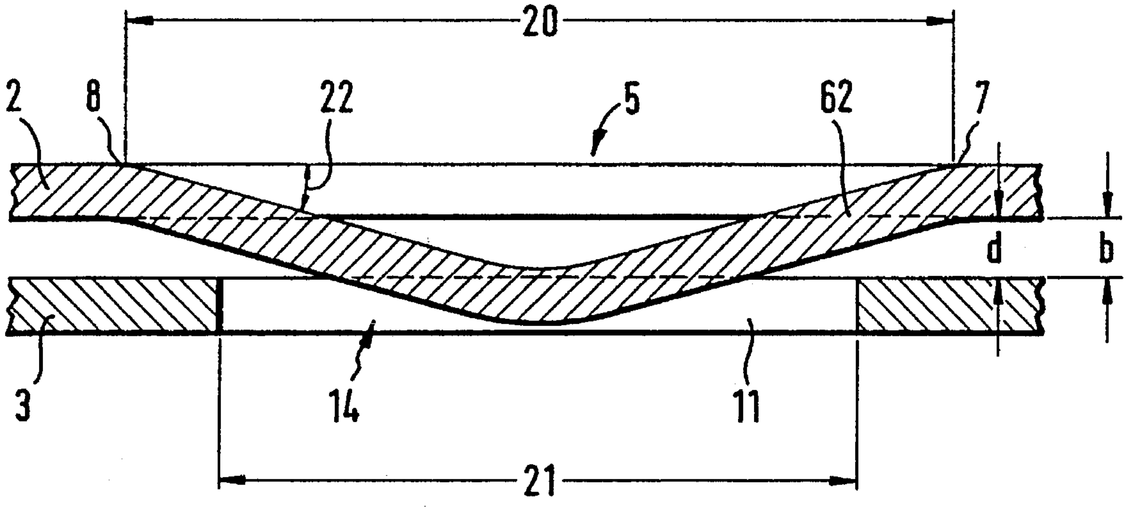
FIG. 3 is a section view taken along line III—III of FIG. 1.
Figure 4:
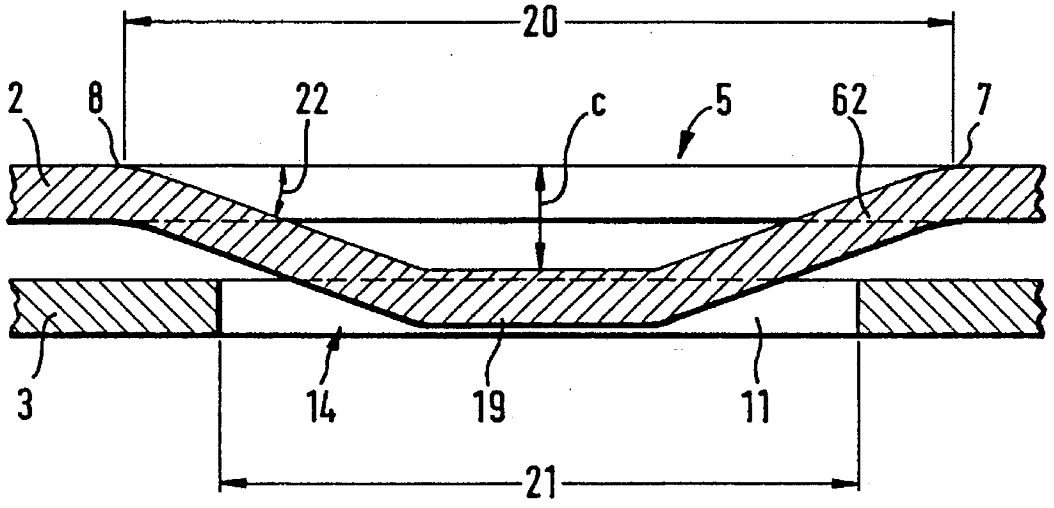
FIG. 4 is a section view according to FIG. 3 with a connecting part according to another embodiment.
Figure 5:
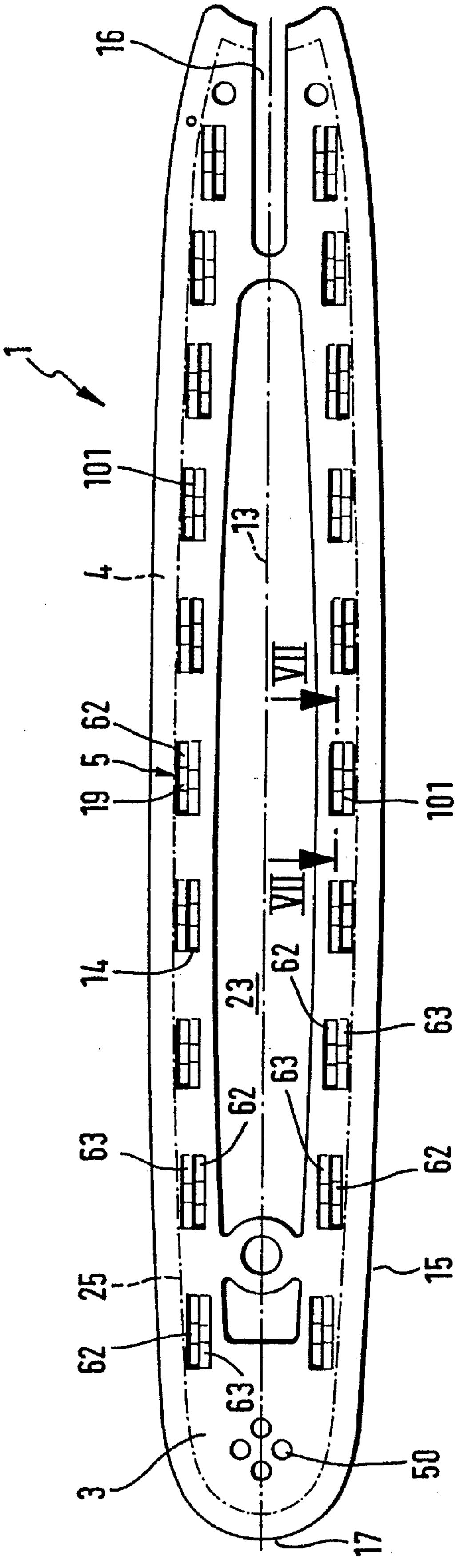
FIG. 5 is a plan view of a guide bar according to another embodiment assembled from two side plates.

As shown in FIG. 3, the lug 62, which is punched out of the side plate 2 so that it protrudes therefrom, projects into the opening 14 only in the region of its peak. For this reason, only a portion of the longitudinal sides lies as a contact surface 9 or 10 on respective counter surfaces 11 or 12 in the opening 14. As shown in FIG. 4, a lug center segment 19 is preferably formed in order to effectively increase the contact surface. The lug center segment 19 lies at a spacing (c) parallel to the side plate 2. The lug center segment 19 then extends approximately over half of the length 21 of the opening 14.

As can be seen especially in FIGS. 3 and 4, the shaped section 20 of a lug 62 is longer than the length 21 of the opening 14. The length 21 of the opening 14 can be held small and therefore the form stability of the side plate is only slightly weakened because only a center segment of the connecting part 5 projects into the opening 14. The connecting part 5 is defined by a lug 62. A longer shaped section 20 guarantees a small bending angle 22 at the ends 7 and 8 of the lug 62 so that an overloading of the material in these critical regions is avoided. The lug 63 is correspondingly configured.

The row formed alternately of connecting parts 5 and receptacles 14 on the one side of the longitudinal center axis 13 of a side plate is offset to the row lying on the other side of the longitudinal center axis 13 so that a side plate (2, 3) is unsymmetrical to the longitudinal center axis 13 with respect to the openings 14 and lugs (62, 63). An opening 14 lies opposite a connecting part 5 at right angles to the longitudinal center axis 13 (see FIGS. 1 and 2). This ensures that two like side plates can be placed one atop the other to form a guide bar in that one of the side plates is rotated 180° about its longitudinal axis. An opening 14 in the opposite-lying side plate then lies next to each connecting part 5 so that an interlocking interengagement of the side plates (2, 3) is already ensured when the plates are placed one atop the other. A further fixing of the side plates (2, 3) to each other in the longitudinal direction can be provided by introducing rivets through rivet openings 50.

In the embodiment of FIGS. 1 to 4, the lugs (62, 63) are fixed to the opposite lying plate in order to provide a tight connection of the two plates to each other. This attachment can be provided by fixing the lugs (62, 63) in the opening 14 by means of adhesive, welding, casting or injection molding with a fill material.

In the embodiment of FIGS. 5 to 8, side plates (2, 3) are provided with an inner cutout 23 in order to further reduce the weight of the guide bar 1. The side plates (2, 3) have an approximately frame-shaped configuration. Like the side plate shown in FIG. 2, this embodiment includes connecting parts 5 in the form of lugs (62, 63) and openings 14 which are arranged along the edge 15 of the guide bar 1. As can be especially seen in FIG. 6, the lugs (62, 63) are preferably provided with a center segment 19 as in the embodiment of FIG. 4. The one longitudinal side 101 of the lug 62 delimits the opening 14 configured as a breakthrough in the side plate so that the connecting part 5 and the opening 14 lie directly next to each other transversely to the longitudinal center axis 13. In order to manufacture a guide bar utilizing like side plates, a first lug 62 lies on the side of the cutout 23 and the lug 62 next in the row lies on the side of the edge 15 of the guide bar 1. The openings 14 as well as the lugs 62 therefore lie along a row on alternating sides. The row of connecting parts 5 and openings 14 is arranged on one side of the longitudinal center axis 13 and is offset to the row lying on the other side of the longitudinal center axis 13. For this reason, one of the two like configured side plates (2, 3) must only be rotated 180° about the longitudinal center axis 13 in order to assemble a guide bar 1. The lug 62 of one side plate 2 then engages in the opposite-lying opening 14 of the other side plate; whereas, the lug 63 of the other side plate 3 engages in the opposite-lying opening 14 of the one side plate 2. This can be seen also from FIG. 7 which clearly shows the lugs 62 and 63.

The longitudinal sides 101 of the lugs 62 and 63 delimit the opening 14 and lie one next to the other; whereas, the other longitudinal side of the lug which forms a contact surface 9 lies against a counter surface 11 delimiting the opening 14.

Figure 8:
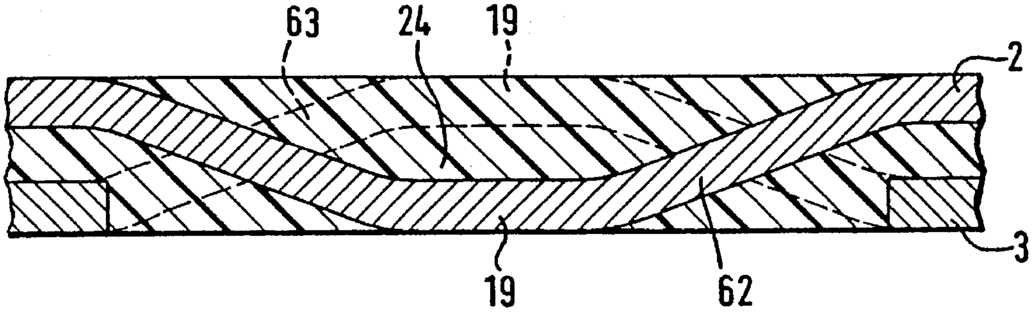
FIG. 8 is a section view corresponding to that of FIG. 7 but with a fill mass injected between the side plates.

The lugs (62, 63) of the side plates 2 and 3, respectively, lie directly next to each other and cross over each other with their mutually adjacent contact surfaces 101 lying atop each other. For this reason, the center segments 19 delimit a free space 24 which is open toward groove 4 as well as toward cutout 23. The configuration of the lugs (62, 63) with a center segment 19 makes available a largest possible volume for the free space 24. If the cutout 23 is now injected up to groove base 25 (FIG. 5) with a filling material such as metal or plastic and preferably glass-fiber reinforced plastic, then this fill material also fills the free space 24 as shown in FIG. 8 by the area hatched to show plastic. After the fill material has cured, it forms a latch between the lugs 62 and 63 so that the side plates 2 and 3 are connected inseparably to each other by the fill material perpendicularly to the plane of the guide bar 1. The latch lies in the free space 24 and the lugs (62, 63) lie one against the other at their longitudinal sides 101. Torsion forces acting on the guide bar 1 are braced by the contact surfaces (9, 101) and counter surfaces (11, 101). For this reason, the fill material is free of these forces. The fill material lying in the free space 24 must take up only the forces acting perpendicularly to the guide bar 1 and, for this reason, the fill material must exhibit an appropriate resistance to shear.

Figure 9:
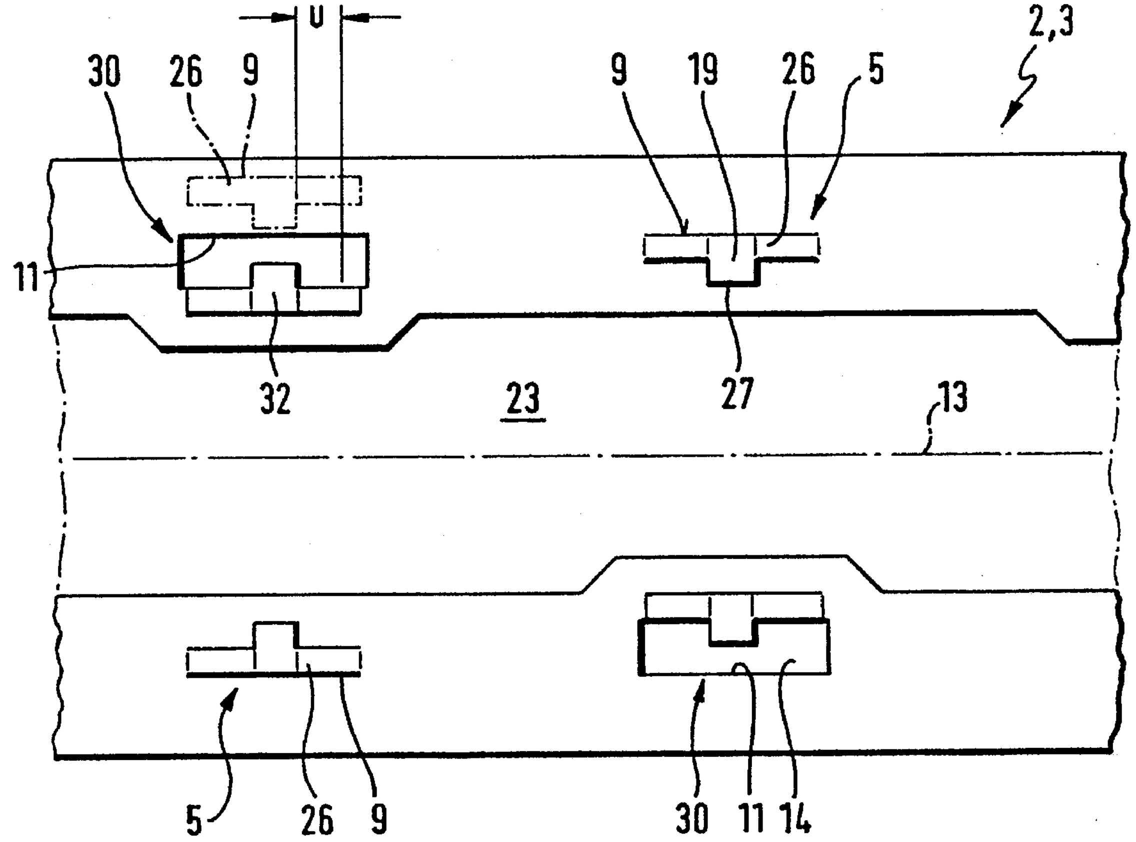
FIG. 9 is a part view of a side plate of another embodiment.
Figure 10:
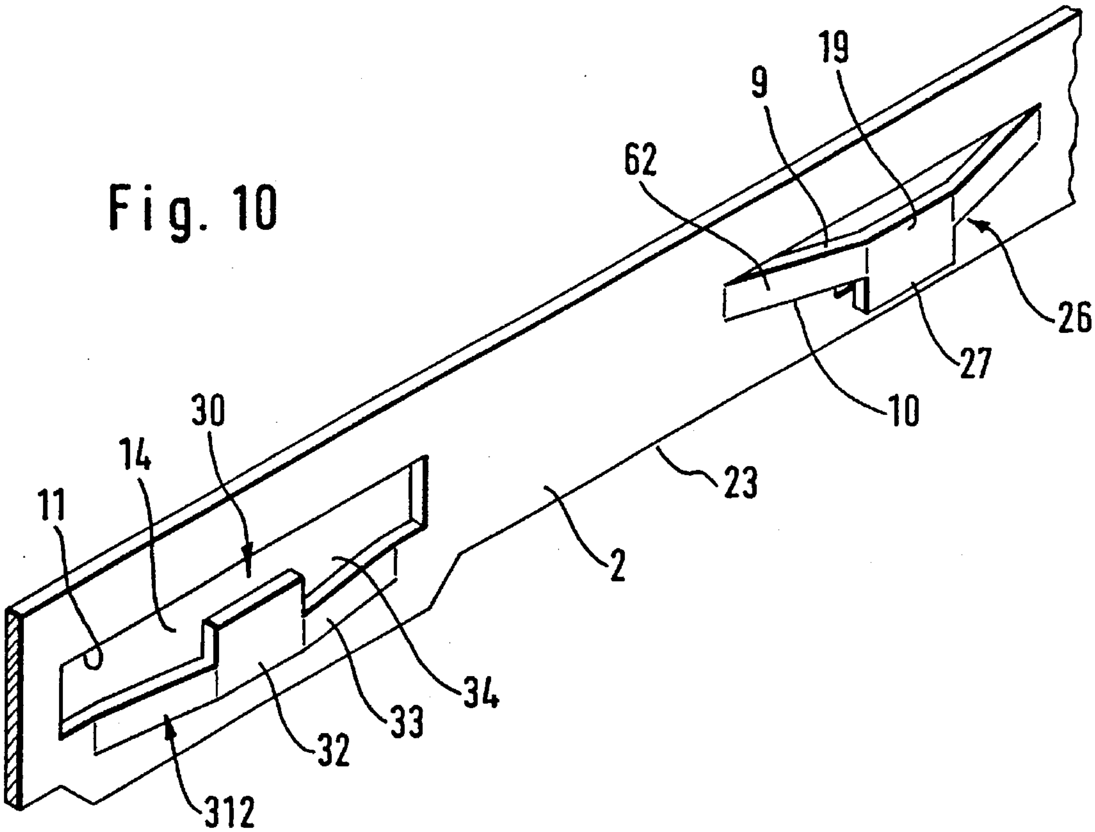
FIG. 10 is a perspective part view of an edge of the side plate of FIG. 9.
Figure 11:
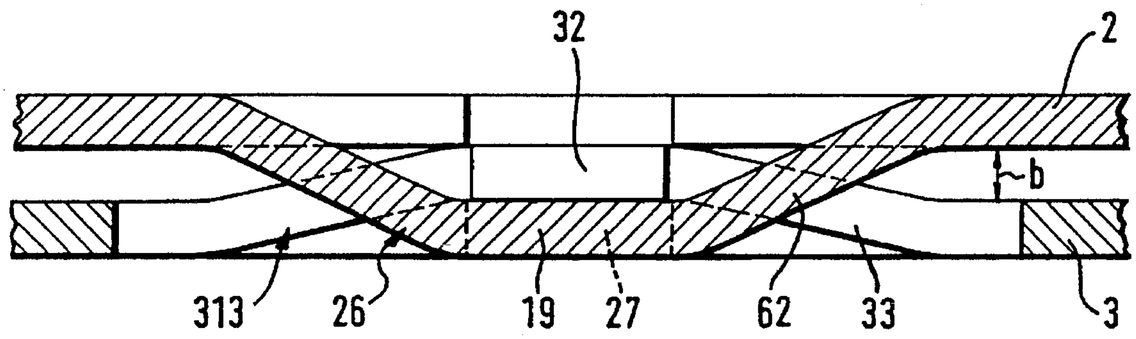
FIG. 11 is a part view similar to that of FIG. 7 through a guide bar assembled from side plates according to FIG. 8.
Figure 12:
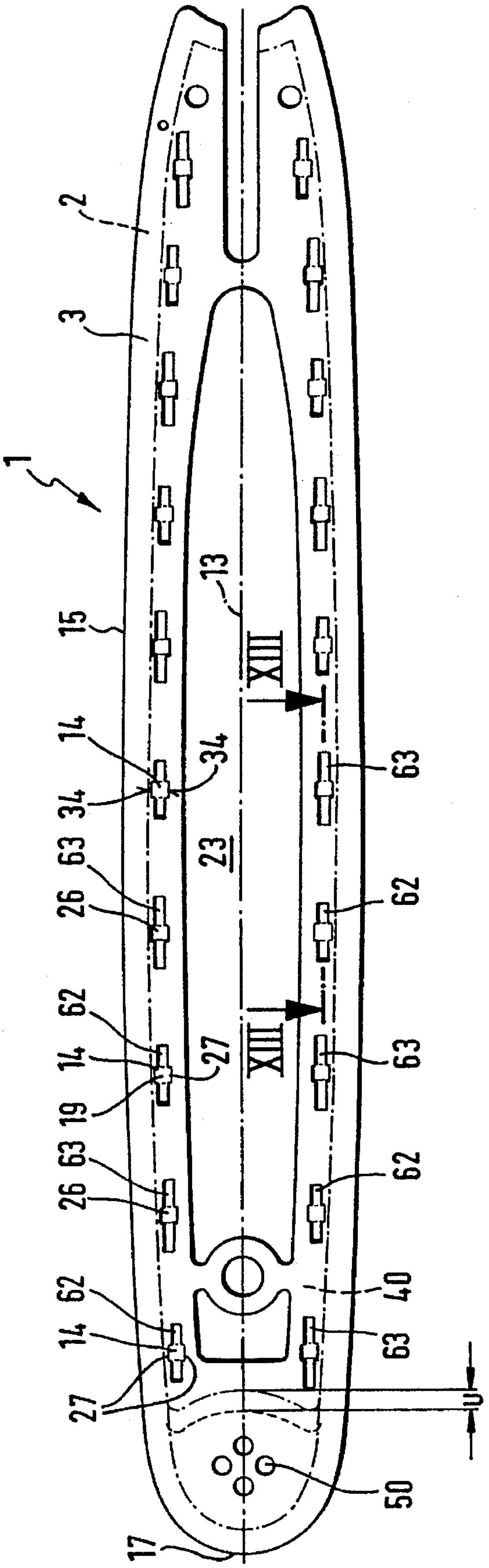
FIG. 12 is a plan view of a guide bar of another embodiment of the invention.

In the embodiment of FIGS. 9 to 11, the connecting part 5 is configured as a latch 26; whereas, a lock 30 is provided in the receptacle 14.

As described with respect to the previous embodiments, the latch 26 comprises a lug 62 having a center segment 19 which has a latch tab 27 which projects beyond the longitudinal side of the lug 62.

Figure 6:
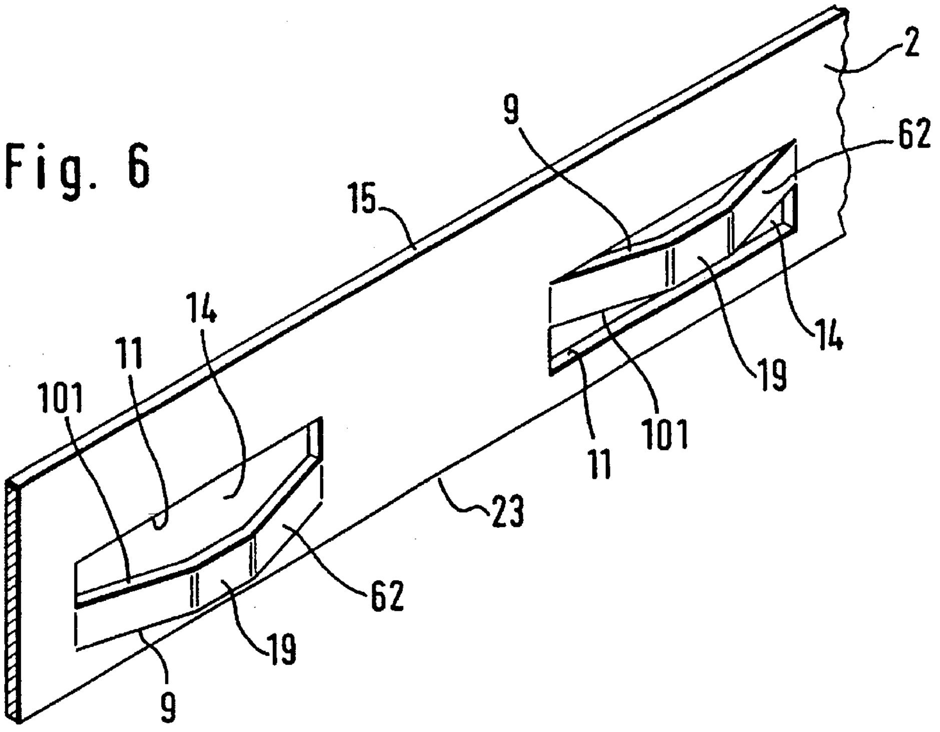
FIG. 6 is a perspective view of the connecting parts of a side plate of the guide bar of FIG. 5.
Figure 7:
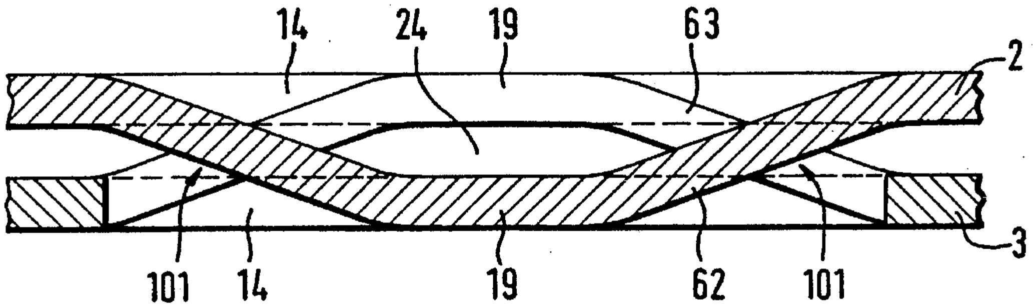
FIG. 7 is a section view taken along line VII—VII of FIG. 5.

The lock 30 is configured in a manner similar to the embodiment of FIG. 6. An opening 14 is provided for receiving the lug 62, that is, the latch 26. One longitudinal side of the opening 14 is delimited by a spacer 312 or 313 punched as a lug 33. The spacer 312 or 313 has a center segment 32 parallel to the plane of the side plate 2 and this center segment projects beyond the opening 14. The center segment 32 has a spacing (b) to the side plate 2 which corresponds to the width of the guide groove. In the assembled state, and as shown in FIG. 11, the center segment 32 of the spacer 313 of the side plate 3 lies against the side plate 2 so that an assembly of the guide bar without a spacer template is possible.

A side plate according to FIG. 9 includes a lock 30 and a latch 26 arranged in a row alternately one behind the other. The row on one side of the longitudinal center axis 13 is offset with respect to the row on the other side of the longitudinal center axis 13. A lock 30 and a latch 26 lie opposite each other at right angles to the longitudinal center axis. In this way, like configured side plates can be manufactured and placed one atop the other to form a guide bar 1. For this purpose, one side plate is rotated by 180° about its longitudinal center axis 13. When placing the plates one atop the other, the latch tabs 27 of the individual latches 26 are positioned next to the particular ones of the center segments 32 of the locks 30. The center segments 32 project beyond the opening 14.

The side plates (2, 3) are then shifted relative to each other by the distance (u) shown in FIG. 9 so that each latch tab 27 engages behind the center segment 32 of the lock 30. In the end position, the side plates lie in coincidence one atop the other. One longitudinal side of the latch 26 lies as a contact surface 9 against the counter surfaces 11 in the opening 14 of the lock 30. On each side of the longitudinal center axis 13, at least one contact surface 9 is provided with an associated counter surface 11. For this reason, a form-tight connection of the side plates results in the plane of the guide bar. The latch tab 27 engages in a form-tight manner behind the lock center segment 32 perpendicularly to the guide bar whereby an inseparable attachment is guaranteed also perpendicularly to the guide bar. A safeguard is provided for a permanent rigid connection of the two side plates (2, 3) to each other. The safeguard prevents a displacement of the side plates relative to each other in the longitudinal direction of the guide bar 1. This can be provided by injecting the hollow spaces with plastic and/or by pins, threaded fasteners or the like extending through both side plates. By rivetting the sprocket wheel end (see rivet openings 50, FIGS. 1, 2 and 5), a fixing of the side plates relative to each other can be provided at the same time without need for further connecting means.

The next embodiment of FIGS. 12 to 17 is directed to a lock connection corresponding to that described with respect to FIGS. 8 to 11. In this next embodiment, the lock element is defined by an intermediate plate 40. The side plates 2 and 3 are again provided with a cutout 23 and include a row of lugs 62 or 63 and openings 14 arranged alternately one behind the other. The row on the one side of the longitudinal center axis 13 is displaced to the row on the other side of the axis 13. In this way, an opening 14 lies directly opposite a lug 62 or 63 and at right angles to the center longitudinal axis 13. Referred to the openings 14 and lugs 62 or 63, each side plate is configured so as to be unsymmetrical with respect to the longitudinal center axis 13.

Figure 15:
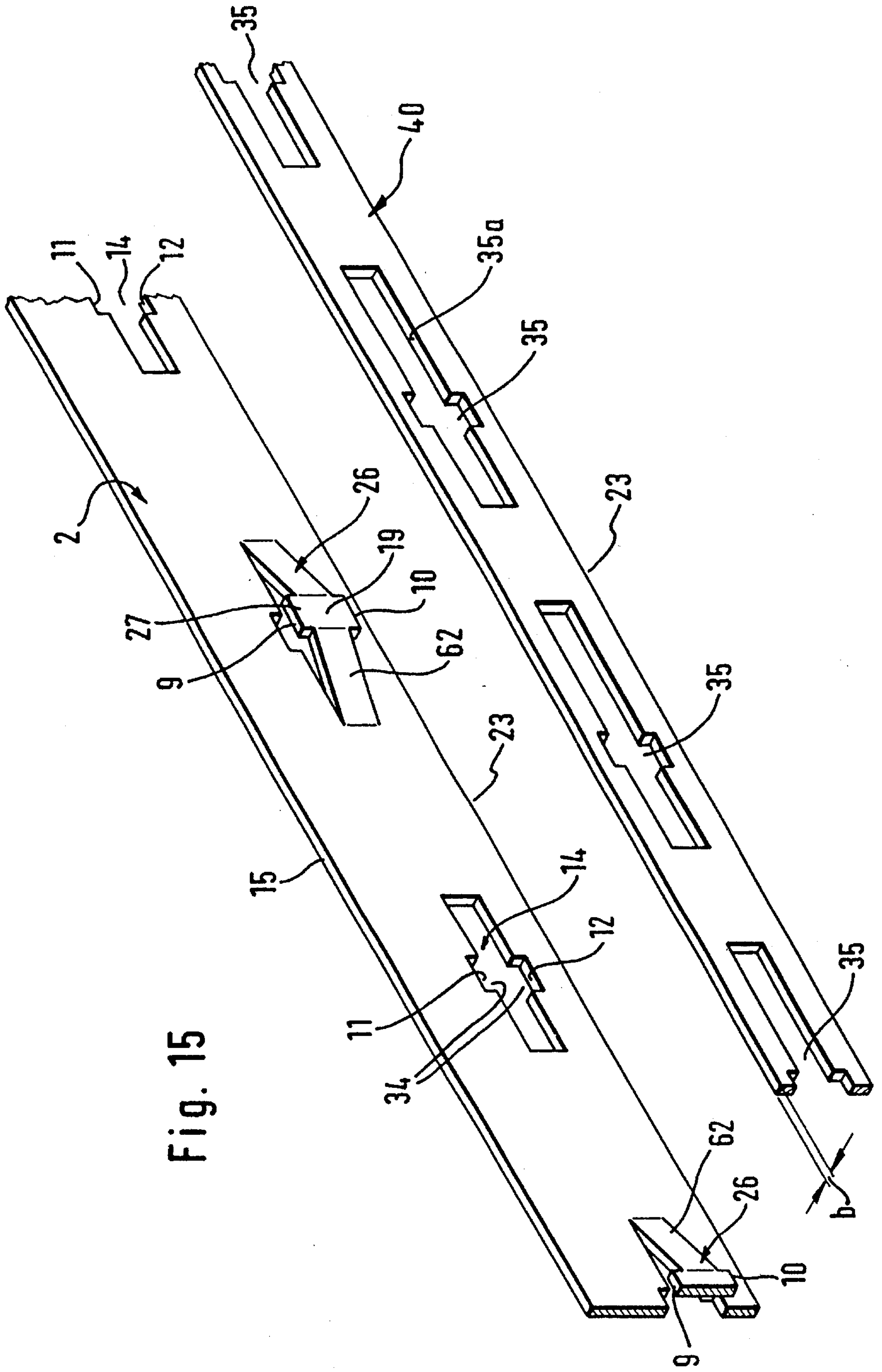
FIG. 15 is a perspective part view of the edge of one of the side plates of FIG. 12 and the edge of an intermediate plate associated therewith.

Each lug 62 or 63 (FIGS. 13 and 15) includes a center segment 19 which preferably lies at a spacing (c) parallel to the side plates (2 or 3) with which it is configured as one piece (FIG. 15). The center segment 19 has at least one latch tab 27 projecting beyond a longitudinal side. In the embodiment shown, a latch tab 27 is added to the center segment 19 and projects beyond each longitudinal side. The opening 14 receives the latch 26 and is configured to provide an accurate fit. Accordingly, the opening 14 has corresponding latch openings 34 in the longitudinal sides.

Figure 13:
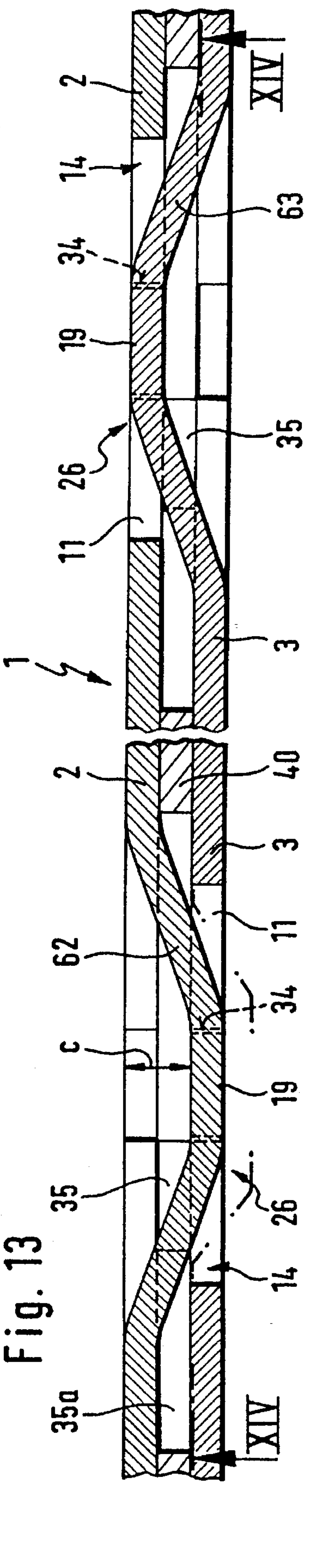
FIG. 13 is a section view taken along line XIII—XIII of FIG. 12.
Figure 14:
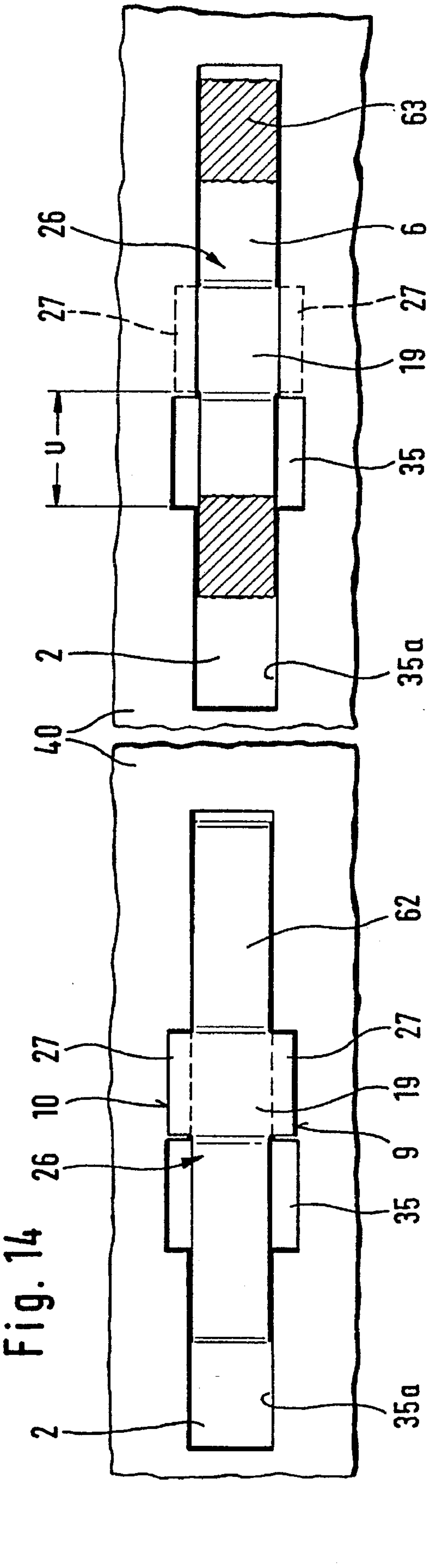
FIG. 14 is a view taken along line XIV—XIV of FIG. 13.
Figure 16:
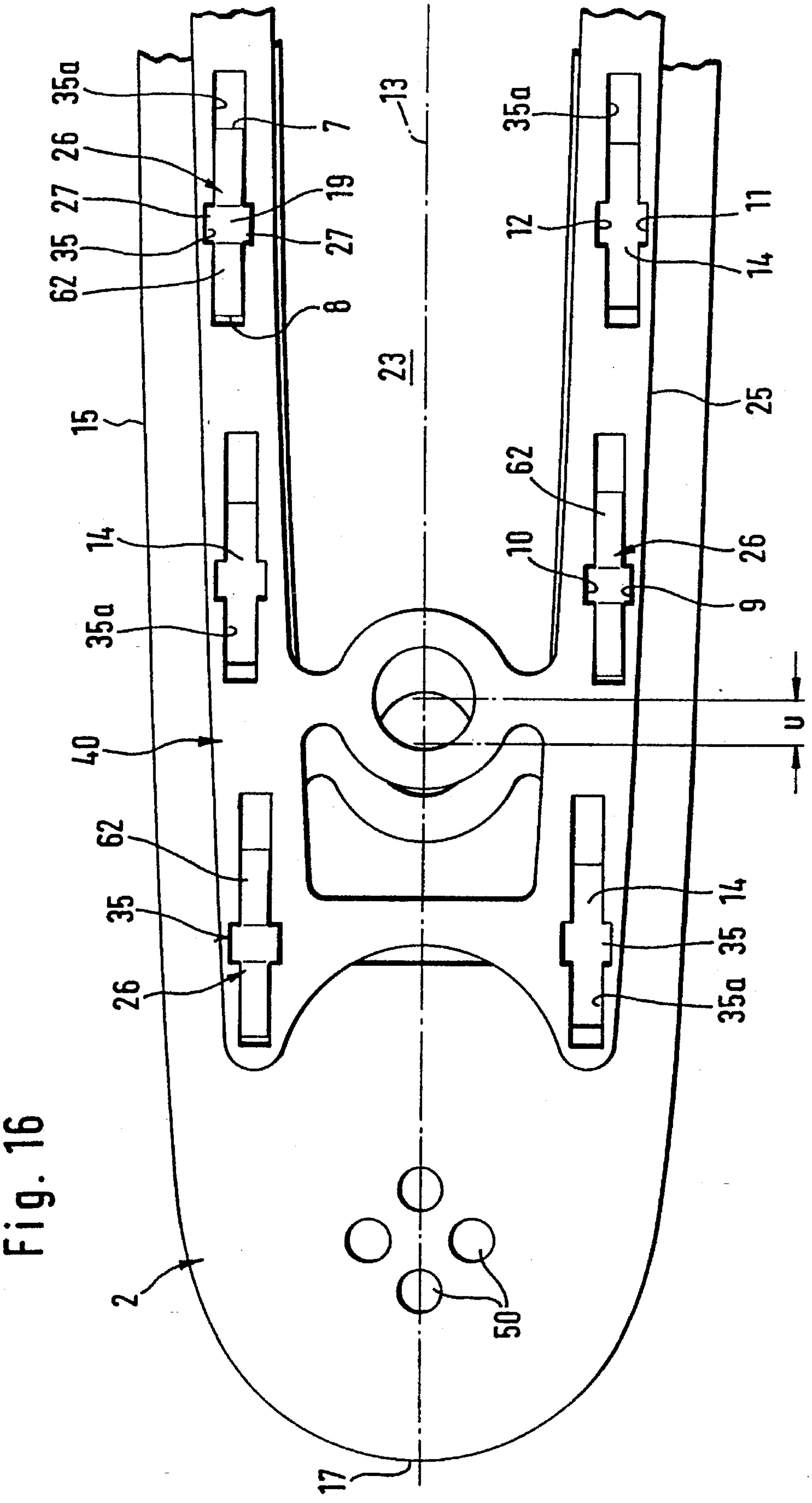
FIG. 16 is a part plan view of the side plate of the embodiment of FIG. 12 with an intermediate plate placed thereon and shown in the open position; and, FIG. 17 is a plan view in accordance with FIG. 16 with the intermediate plate in the closed position.
Figure 17:
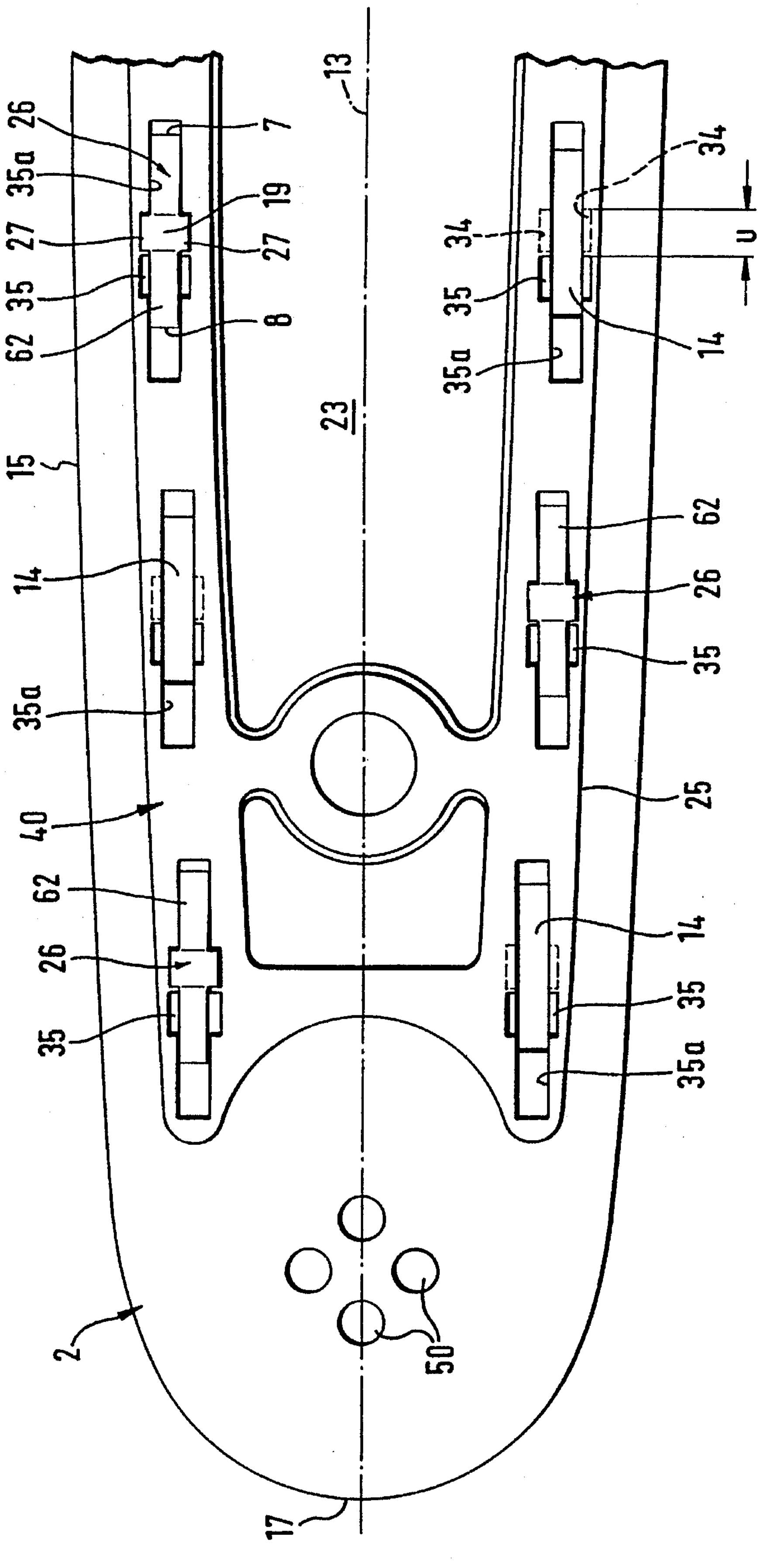

A frame-like intermediate plate 40 is mounted between the side plates 2 and 3 (FIG. 13)which define the guide bar. The intermediate plate 40 has lock openings 35 which correspond to the openings 14 in size and configuration (see FIGS. 15 to 17) and has a central cutout 23. A number of lock openings 35 arranged in a row are provided in the intermediate plate 40 corresponding to the number of latches 26 in the side plates. When the side plates 2 and 3 are placed together, the lock openings 35 of the intermediate plate 40 are, at first, coincident with the openings 14 (FIG. 16) so that the latches 26 project through the lock openings 35 into the openings 14 of the opposite-lying side plate (FIG. 13). When the side plates (2, 3) lie one atop the other in coincidence, then the intermediate plate 40 is pushed by a latching distance (u) as shown in FIGS. 14 and 16. The narrower segment 35*a* of the lock opening 35 is then pushed under the latch tabs 27 of the lugs (62, 63) so that the side plates, which are configured as one piece with the latch 26, are connected so as to be interlocked with the intermediate plate 40 perpendicularly to the guide bar (see FIGS. 14 and 17).

The lugs 62 with the latches 26 of the one side plate 2 are interlocked with the intermediate plate 40 and the lugs 63 with the latches 26 of the other side plate 3 are also interlocked with the intermediate plate 40 (see FIG. 13). For this reason, both side plates 2 and 3 are interlocked with each other via the intermediate plate 40 in a direction perpendicular to the guide bar 1.

Only the position of the intermediate plate 40 must now be fixed in order to secure the tight connection. This can be provided by filling the cutout 23 with plastic or by rivets or the like which extend perpendicularly through the guide bar 1 in rivet openings 50. The lugs 62 of the side plate 2 project through the lock openings 35 of the intermediate plate 40 into the openings 14 of the side plate 3. Correspondingly, the lugs 63 of the side plate 3 project through the lock openings 35 of the intermediate plate 40 into the openings 14 of the side plate 2. Contact surfaces (9, 10) are provided on the lugs (62, 63) and project perpendicularly to the side plates as described above with respect to the previous embodiments. These contact surfaces lie against corresponding counter surfaces (11, 12) in the openings. The surfaces preferably lie parallel to and especially on both sides of the longitudinal center axis 13 whereby a torsion-resistant connection is formed.

It is understood that the foregoing description is that of the preferred embodiments of the invention and that various changes and modifications may be made thereto without departing from the spirit and scope of the invention as defined in the appended claims.

What is claimed is:

1. A guide bar for guiding the saw chain of a chain saw, the guide bar comprising:

two mutually adjacent side plates which are approximately coincident to each other;

said side plates being spaced from each other at a predetermined spacing (d) to conjointly define an outer peripheral guide groove for guiding the saw chain on the guide bar;

a first one of said side plates having a first plurality of connecting parts projecting through said guide groove up to a second one of said side plates;

said first side plate having a first plurality of receptacles defining respective counter surfaces likewise extending perpendicular to said side plates;

said connecting parts and said receptacles being arranged along said first side plate;

said second side plate having a second plurality of connecting parts projecting through said guide groove up to said first one of said side plates;

said second side plate having a second plurality of receptacles defining respective counter surfaces likewise extending perpendicular to said side plates;

said connecting parts and said receptacles of said second side plate being arranged along said second side plate;

said connecting parts of said first and second side plates having respective contact surfaces;

said contact surfaces of said first side plate being in contact engagement with corresponding ones of said counter surfaces of said second side plate;

said contact surfaces of said second side plate being in contact engagement with corresponding ones of said counter surfaces of said first side plate; and, holding means fixedly holding said first and second plates together to define said spacing (d).

2. The guide bar of claim 1, said connecting parts and said receptacles of said first side plate being arranged approximately in a row alternating one behind the other; and, said connecting parts and said receptacles of said second side plate being likewise arranged approximately in a row alternating one behind the other.

3. The guide bar of claim 1, said guide bar defining a longitudinal center axis; each one of said receptacles of said first side plate being directly next to a corresponding one of said connecting parts of said first plate so as to define a plurality of receptacle/connecting part pairs arranged along the length of said first side plate; and, the receptacle and connecting part of each pair being arranged transverse to said longitudinal center axis and in such a manner that one edge of the connecting part delimits the receptacle.

4. The guide bar of claim 1, said first and second side plates being configured so that they are both identical to each other.

5. A guide bar for guiding the saw chain of a chain saw, the guide bar comprising:

two mutually adjacent side plates which are approximately coincident to each other;

said side plates being spaced from each other at a predetermined spacing (d) to conjointly define an outer peripheral guide groove for guiding the saw chain on the guide bar;

a first one of said side plates having a connecting part projecting through said guide groove up to a second one of said side plates;

said connecting part having a contact surface formed thereon to extend approximately perpendicular to said side plates;

said second side plate having a counter surface likewise extending perpendicular to said side plates;

said contact surface and said counter surface being in mutual contact engagement; and, holding means fixedly holding said first and second plates together to define said spacing (d).

6. The guide bar of claim 5, said guide bar defining a guide bar plane and a longitudinal center axis; said first side plate having a plurality of said connecting parts defining respective contact surfaces; said second side plate having a plurality of said counter surfaces in contact engagement with corresponding ones of said contact surfaces; and, said connecting parts being configured to fix said side plates in said guide bar plane transversely to said axis.

7. The guide bar of claim 6, said contact surfaces and said counter surfaces all lying approximately parallel to said longitudinal center axis.

8. The guide bar of claim 7, said connecting parts and said counter surfaces corresponding thereto being on each side of said longitudinal center axis.

9. The guide bar of claim 6, said connecting parts each being formed as one piece with said first side plate.

10. The guide bar of claim 9, said connecting parts each being formed as a belt-like lug from said first side plate by stamping.

11. The guide bar of claim 10, said belt-like lug having two longitudinal ends whereat said lug is connected to said first side plate.

12. The guide bar of claim 11, each of said lugs having a longitudinal edge defining the contact surface corresponding thereto.

13. The guide bar of claim 12, each of said lugs having a mid segment parallel to and spaced from said first side plate.

14. The guide bar of claim 6, said second side plate having a plurality of receptacles formed therein for receiving corresponding ones of said connecting parts; and, said receptacles defining respective ones of said counter surfaces.

15. The guide bar of claim 14, said receptacles being respective openings formed in said second side plate.

16. The guide bar of claim 15, said openings being breakthroughs in said second side plate.

17. The guide bar of claim 15, each of said openings having two of said counter surfaces formed therein so as to be mutually adjacent; and, each of said connecting parts having two of said contact surfaces formed thereon; and, each one of said connecting parts engaging between the counter surfaces of a corresponding one of said openings so as to cause said contact surfaces of said one connecting part to be in contact with respective ones of said counter surfaces of said one opening approximately without play.

18. The guide bar of claim 14, said connecting parts of said first side plate being interlocked with said second side plate perpendicularly to said guide bar.

19. The guide bar of claim 18, said connecting parts being configured as respective latches; and, said receptacles being configured as respective locks; said latches being held in corresponding ones of said locks perpendicularly to said guide bar thereby defining said holding means.

20. The guide bar of claim 18, said connecting parts being configured as respective latches; said holding means including said latches and further including a displaceable plate configured as a lock for locking said latches perpendicularly to said guide bar.

21. The guide bar of claim 6, said holding means including welds for holding respective ones of said connecting parts to said second side plate.

* * * * *